Patented Sept. 11, 1945

2,384,754

UNITED STATES PATENT OFFICE 2,384,754

MONOAZO DYESTUFFS

Arthur Howard Knight and William Elliot Stephen, Blackley, Manchester, England, assignors to Imperial Chemical Industries Limited, a corporation of Great Britain No Drawing. Application January 14, 1943, Serial No. 472,400. In Great Britain February 2, 1942

5 Claims. (Cl. 260—199)

This invention relates to the manufacture of new monoazo acid dyestuffs suitable for the colouring of animal fibres.

According to the invention monoazo dyestuffs are made by diazotising an amine of the general formula X—CO—NY—R—NH$_2$ in which R stands for a m- or p-phenylene residue which may carry simple azo dyestuff substituents, for example, methyl, alkoxy or sulphonic groups but contains no carboxylic acid group in ortho position to the primary amino group, X stands for a mono-chloro- or mono-bromo-alkyl radical ($C_1$—$C_3$) and Y stands for hydrogen or alkyl ($C_1$—$C_6$), and coupling the diazo compound so obtained with 1-amino-8-naphthol-(4 or 6)-monosulphonic acid or 1-amino-8-naphthol-(3:6 or 4:6)-disulphonic acid, wherein one amino hydrogen is substituted by an acyl group —CO—alkyl ($C_1$—$C_6$) and the other, if desired, by an alkyl radical.

Also according to the invention we use the new dyestuffs in colouring animal fibres, e. g., wool and silk.

The dyestuffs dye wool from an acid dyebath in various shades of red, affording dyeings of very good fastness to severe washing and milling and good fastness to light.

As examples of diazo components which can be employed according to the invention, are mentioned:

4-amino-1-N-ethyl-omega-chloroacetanilide
4-amino-1-N-isopropyl-omega-chloroacetanilide,
4-amino-1-N-n-butyl-omega-chloroacetanilide,
4-amino-2-N-ethyl-omega-chloroacet-toluidide,
4-amino-2-N-ethyl-omega-bromopropion-toluidide,
4-amino-2-N-ethyl-α-bromobutyryl-toluidine,
3-amino-omega-chloroacetanilide-4-sulphonic acid,
2-amino-4-N-ethyl-omega-chloroacet-toluidide,
4-amino-2-N-ethyl-α-bromopropiontoluidide,
4-amino-2-N-ethyl-omega-chloropropiontoluidide,
4-amino-1-N-ethyl-omega-chloropropionanilide,
4-amino-1-N-ethyl-omega-bromopropionanilide,
4-amino-1-N-sec-butyl-omega-chloroacetanilide,
4-amino-omega-chloroacetanilide-3-sulphonic acid
4-amino-2-N-ethyl-omega-chloroacetanisidide,
4-amino-1-N-n-butyl-omega-chloroacetanilide-2-sulphonic acid,
4-amino-1-N-ethyl-omega-bromoacetanilide,
4-amino-omega-chloroacetanilide,
4-amino-omega-chloropropionanilide.

The above diazo components can be prepared by methods described in British Patent No. 544,409 or our U. S. Patent No. 2,346,492.

As examples of coupling components of the invention are mentioned:

1-acetylamino-8-naphthol-3:6- or -4:6-disulphonic acid,
1-propionylamino-8-naphthol-3:6- or -4:6-disulphonic acid,
1-n-butyrylamino-8-naphthol-3:6- or -4:6-disulphonic acid,
1-iso-butyrylamino-8-naphthol-3:6- or -4:6-disulphonic acid,
1-acetylamino-8-naphthol-6-sulphonic acid,
1-acetylamino-8-naphthol-4-sulphonic acid,
1-acetyl-ethylamino-8-naphthol-3:6-disulphonic acid.

Azo dyes made by coupling a diazo compound of a benzene derivative which contains an alkylacidylamino group, e. g., 4-ethylacetylamino-2-toluidine with an azo dyestuff component, e. g., 2-phenylamino-8-naphthol-6-sulphonic acid have been described. The present dyestuffs are distinguished from such described dyestuffs by giving red shades of outstanding fastness to milling and severe washing.

British Patent No. 432,020 describes the manufacture of azo-dyestuffs by coupling diazotised orthanilic acid which may carry a monovalent substituent excluding halogen in the o-position to the amino group, and may contain further substituents other than the hydroxy group, e. g., diazotised 1-acetylamino-3-aminobenzene-4-sulphonic acid, with a 1-, 2-, 3- or 4-acylamino-, -acyl-aryl- or -acylalkylamino-8-naphthol-6-sulphonic acid, e. g., 1-acetylamino-8-naphthol-6-sulphonic acid, but contains no mention of the chloro- or bromo-alkyl—CO— group which characterises the present diazo components.

British Patent No. 472,171 describes making azo-dyestuffs containing at least one solubilising group by coupling diazotised N-acyl-N-alkylphenylenediamines in which the alkyl group is isopropyl or β-methyl or ββ'-dimethylisopropyl and the phenylene residue may contain further substituents, e. g., 1-(N-acetylisopropylamino)-4-aminobenzene with a coupling component, e. g., 1-acetyl-amino-8-naphthol-4:6-disulphonic acid but mentions no diazo component of the present invention. Moreover, the dyestuffs of the present invention are superior to those of said Patent No. 472,171 in respect of fastness to severe washing and milling.

The invention is illustrated, but not limited, by the following examples in which the parts are by weight.

Example 1

21.25 parts of 4-amino-1-N-ethyl-omega-chloroacetanilide are dissolved in a mixture of 300 parts of water and 25 parts of 36% hydrochloric acid. 6.9 parts of sodium nitrite are added. The solution of the diazo compound so-obtained, after cooling to 5°–10° C., is added to a stirred and cooled mixture of 40.6 parts of disodium 1-acetylamino - 8 - naphthol-3:6-disulphonate, 80 parts of sodium chloride, 350 parts of water and 21 parts of anhydrous sodium carbonate. Coupling is rapid and, when complete, further sodium chloride is added if necessary to precipitate the new dyestuff. The latter is filtered off and dried. It dyes wool from a dyebath containing sulphuric acid and Glauber's salt in bluish red shades of very good fastness to severe washing and milling, and good fastness to light.

If, instead of the disodium 1-acetylamino-8-naphthol-3:6-disulphonate used above there is employed the same amount of disodium 1-acetyl-amino-8-naphthol-4:6-disulphonate, a dyestuff is obtained which dyes wool from an acid bath in yellower shades of red, having similar fastness properties.

Example 2

22.6 parts of 4-amino-2-N-ethyl-omega-chloro-acet-toluidide are dissolved in a mixture of 350 parts of water and 25 parts of 36% hydrochloric acid. To the solution at 5°–10° C. there are added 6.9 parts of sodium nitrite. The solution of the diazo compound is added with stirring to a mixture of 40.6 parts of disodium 1-acetylamino-8-naphthol-3:6-disulphonate in 400 parts of water at 5°–10° C. containing 80 parts of sodium chloride and sufficient sodium carbonate or sodium bicarbonate to keep the coupling medium alkaline to litmus. The new dyestuff is filtered off, washed with 10% sodium chloride solution and dried. It forms a reddish brown powder which dissolves in water and in concentrated sulphuric acid to form bluish red solutions.

The new dyestuff dyes wool from a dyebath containing sulphuric acid and Glauber's salt in bright red shades of very good fastness to severe washing and milling and good fastness to perspiration and light.

Example 3

22.65 parts of 4-amino-1-N-isopropyl-omega-chloro-acetanilide are dissolved in a mixture of 300 parts of water and 25 parts of 36% hydrochloric acid. 6.9 parts of sodium nitrite are added. The diazo solution after cooling to 5°–10° C., is added to a stirred mixture of 40.6 parts of disodium 1 - acetylamino - 8-naphthol-4:6-disulphonate, 400 parts of water, 80 parts of sodium chloride and 21 parts of anhydrous sodium carbonate at 5°–10° C. When coupling is complete more sodium chloride is added, if necessary, to precipitate the new dyestuff. The latter is filtered off and dried.

The new dyestuff dyes wool from an acid bath in red shades, having very good fastness to severe washing and milling, and good fastness to light.

Example 4

22.65 parts of 4-amino-2-N-ethyl-omega-chloropropiontoluidine are dissolved in a mixture of 300 parts of water and 25 parts of 36% hydrochloric acid. The solution is cooled to 5°–10° C. and to it are added 6.9 parts of sodium nitrite. The resulting diazo solution is stirred into a mixture of 40.6 parts of disodium 1-acetylamino-8-naphthol-4:6-disulphonate, 400 parts of water, and 28 parts of sodium acetate crystals. When coupling is complete the new dyestuff is precipitated by the addition of 250 parts of sodium chloride, filtered off and dried.

The new dyestuff forms a red powder which dissolves in water to a yellowish red solution and in concentrated sulphuric acid to a red solution. It dyes wool from a dyebath containing sulphuric acid and Glauber's salt in bright red shades, the dyeings having good fastness to washing, milling and light.

If the disodium 1-acetylamino-8-naphthol-4:6-disulphonate employed above is replaced by the same amount of disodium 1-acetylamino-8-naphthol-3:6-disulphonate or by 43.5 parts of disodium 1 - iso - butyryl -amino-8-naphthol-3:6-disulphonate, dyestuffs are obtained which dye wool from an acid bath in bluer shades of red, the dyeings having similar fastness properties.

Example 5

22.6 parts of 4-amino-2-N-ethyl-omega-chloro-acet-toluidine are diazotised as in Example 2. The diazo solution is cooled to 5°–7° C. and added to a similarly cooled solution of 30.3 parts of sodium 1-acetylamino-8-naphthol-4-sulphonate in 350 parts of water containing 21 parts of anhydrous sodium carbonate. Coupling is rapid. The new dyestuff is filtered off, washed with 5% sodium chloride solution and dried.

The new dyestuff dyes wool from an acid dyebath in bluish crimson shades, the dyeings having very good fastness to severe washing and milling and good fastness to light.

A dyestuff which dyes wool in still bluer shades is obtained if, the 4-amino-2-N-ethyl-omega-chloroacet-toluidide used above is replaced by the same amount of 4-amino-1-N-ethyl-omega-chloropropionanilide.

Example 6

22.65 parts of 4-amino-2-N-ethyl-omega-chloroacet-toluidide are diazotised as in Example 2. The diazo solution at a temperature of 8–10° C. is gradually stirred into a similarly cooled solution of 30.3 parts of sodium 1-acetylamino-8-naphthol-6-sulphonate in 475 parts of water containing 28 parts of sodium acetate crystals. Stirring is continued until coupling is complete. The new dyestuff is filtered off, washed with 5% sodium chloride solution and dried.

The new dyestuff dyes wool from a dyebath containing sulphuric acid and Glauber's salt in red shades, the dyeings having very good fastness to severe washing and milling and good fastness to light.

Example 7

28.65 parts of 4-omega-chloroacetylamino-phenyl sulphamate are dissolved in 350 parts of water containing 25 parts of 36% hydrochloric acid. An aqueous solution of 6.9 parts of sodium nitrite is added. The resulting diazo solution (which corresponds to 18.45 parts of 4-amino-omega-chloroacetanilide), is added to a solution at 5°–7° C. of 40.6 parts of disodium 1-acetylamino-8-naphthol-3:6-disulphonate and 80 parts of sodium chloride in 400 parts of water, the coupling medium being kept alkaline to litmus by the addition of sodium carbonate. The new dyestuff is filtered off, washed with 20% sodium chloride solution and dried. It dyes wool from an acid bath in very bluish red shades, the dyeings having very good fastness to severe washing and milling.

*Example 8*

19.85 parts of 4 - amino - omega - chloroproprionanilide (obtainable as described below) are dissolved in a mixture of 300 parts of water and 25 parts of 36% hydrochloric acid. 6.9 parts of sodium nitrite are added. The diazo solution is stirred at 5°–7° C. into a similarly cooled solution of 40.6 parts of disodium 1-acetylamino-8-naphthol-3:6-disulphonate in 400 parts of water containing 21 parts of anhydrous sodium carbonate. When coupling is complete the dyestuff is precipitated by the addition of 150 parts of sodium chloride, filtered off, washed with 20% aqueous sodium chloride and dried.

The new dyestuff forms a black-brown powder which dissolves in water and in concentrated sulphuric acid to bluish crimson solutions. It dyes wool from a dyebath containing sulphuric acid and Glauber's salt in very bluish red shades, the dyeings having good fastness properties.

4 - amino - omega-chloropropionanilide is obtained by interaction between 4-nitroaniline and omega-chloropropionyl chloride in toluene followed by reduction of the resulting 4-nitro-omega-chloropropionanilide.

*Example 9*

28.5 parts of 4-amino-2-N-ethyl-omega-bromopropion-toluidide are dissolved in 400 parts of water and 25 parts of 36% hydrochloric acid. 6.9 parts of sodium nitrite are then added. The solution of the diazo compound is stirred into a solution at 5°–10° C. of 43.5 parts of disodium 1-n-butyrylamino - 8-naphthol-4:6-di-sulphonate in 500 parts of water containing 28 parts of sodium acetate crystals. When coupling is complete the dyestuff is precipitated by the addition of 120 parts of sodium chloride, filtered off, washed with 10% aqueous sodium chloride and dried.

The new dyestuff dyes wool from an acid bath in bright red shades, the dyeings having good fastness to washing, milling and light.

If the 4-amino-2-N-ethyl-omega-bromo-propiontoluidide used above is replaced by the same amount of 4-amino-2-ethyl-α-bromopropiontoluidide a wool dyestuff is obtained having similar shade and fastness properties.

*Example 10*

24 parts of 4-amino-1-N-sec-butyl-omega-chloroacetanilide are dissolved in a mixture of 400 parts of water and 25 parts of 36% hydrochloric acid. Diazotisation is effected by the addition of 6.9 parts of sodium nitrite. The diazo solution is stirred into a solution of 40.6 parts of disodium 1-acetylamino-8-naphthol-3:6 - disulphonate in 400 parts of water containing 28 parts of sodium acetate crystals. When coupling is complete 150 parts of sodium chloride are added to precipitate the dyestuff. The latter is then filtered off, washed with 20% aqueous sodium chloride and dried.

The new dyestuff dyes wool from an acid bath in red shades, the dyeings having very good fastness to severe washing and milling and good fastness to light.

We claim:

1. A monazo dyestuff which in the form of its acid is represented by the formula

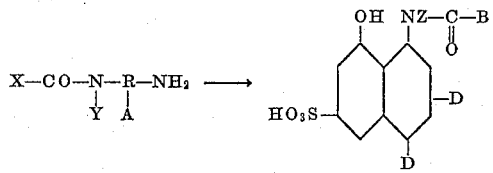

wherein —R—NH₂ is an arylene nucleus of the group consisting of anilino, toluidino and anisidino; A is one of the group consisting of hydrogen and sulfonic acid; X is a mono-halogenoalkyl group having 1 to 3 carbons in which halogen is one of the group consisting of chlorine and bromine; Y is one of the group consisting of hydrogen and alkyl having 1 to 6 carbons; Z is one of the group consisting of hydrogen and lower alkyl; B is lower alkyl; and one D is hydrogen and the other D is one of the group consisting of hydrogen and sulfonic acid; said compound being devoid of a carboxyl group ortho to the azo bridge.

2. A monazo dyestuff in accordance with claim 1 in which one D of the coupling component is sulfonic acid.

3. A monazo dyestuff which in the form of its acid is represented by the formula

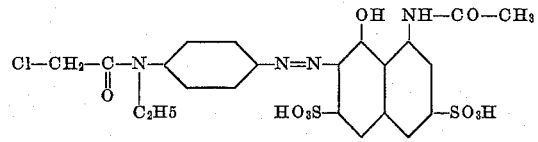

4. A monazo dyestuff which in the form of its acid is represented by the formula

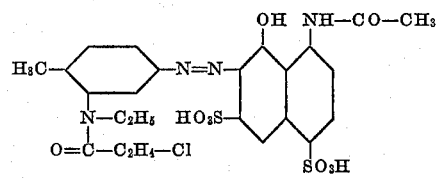

5. A monazo dyestuff which in the form of its acid is represented by the formula

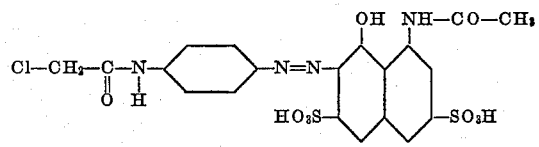

ARTHUR HOWARD KNIGHT.
WILLIAM ELLIOT STEPHEN.